United States Patent
Lee et al.

(10) Patent No.: US 11,148,601 B2
(45) Date of Patent: Oct. 19, 2021

(54) MOVING MULTI CONSOLE FOR VEHICLE

(71) Applicants: HYUNDAI MOTOR COMPANY, Seoul (KR); KIA MOTORS CORPORATION, Seoul (KR)

(72) Inventors: Eun Il Lee, Seoul (KR); Byung Seok Kong, Gunpo-si (KR); Hyeon Ju An, Suwon-si (KR); Sung Sik Choi, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 170 days.

(21) Appl. No.: 16/672,836

(22) Filed: Nov. 4, 2019

(65) Prior Publication Data

US 2021/0009042 A1 Jan. 14, 2021

(30) Foreign Application Priority Data

Jul. 12, 2019 (KR) .......................... 10-2019-0084332

(51) Int. Cl.
 *B60R 7/04* (2006.01)
(52) U.S. Cl.
 CPC ...................................... *B60R 7/04* (2013.01)
(58) Field of Classification Search
 CPC .......... B60R 7/04; B60N 2/773; B60N 2/793; B60N 2/763
 USPC .......................... 296/37.8, 24.34, 1.09, 24.46
 See application file for complete search history.

(56) References Cited

U.S. PATENT DOCUMENTS

| | | | | |
|---|---|---|---|---|
| 6,032,587 | A * | 3/2000 | Salenbauch ............ | B60N 3/002 108/44 |
| 8,167,348 | B2 * | 5/2012 | Fesenmyer ............ | B60N 2/793 296/24.34 |
| 2010/0201147 | A1 * | 8/2010 | Jones ..................... | B60N 2/793 296/24.34 |
| 2012/0074726 | A1 * | 3/2012 | Takai ....................... | B60R 7/04 296/24.34 |
| 2015/0258923 | A1 * | 9/2015 | Skapof ................... | B60N 2/753 296/24.34 |
| 2021/0009042 | A1 * | 1/2021 | Lee .......................... | B60R 7/04 |

FOREIGN PATENT DOCUMENTS

CN 112141002 A * 12/2020 ............... B60R 7/04

* cited by examiner

*Primary Examiner* — D Glenn Dayoan
*Assistant Examiner* — E Turner Hicks
(74) *Attorney, Agent, or Firm* — McDonnell Boehnen Hulbert & Berghoff LLP

(57) ABSTRACT

The present disclosure provides a moving multi console for a vehicle, which is designed to be used in various applications in the confined interior space in a vehicle, and which includes a second console slidably and rotatably mounted on a floor panel, a first console slidably and rotatably coupled to the second console, and first and second guide shafts, which are fixed at lower ends thereof to the floor panel and are inserted at upper ends thereof into the second console and the first console so as to guide and support sliding movement and rotating movement of the second console and the first console.

13 Claims, 16 Drawing Sheets

- WALK-THROUGH MODE -

- WALK-THROUGH MODE -

- REAR SEAT CONVENIENCE MODE -

- REAR SEAT CONVENIENCE MODE -

– FRONT SEAT CONVENIENCE MODE –

– FRONT SEAT CONVENIENCE MODE –

"KNEE REST"

"PROTECTOR"

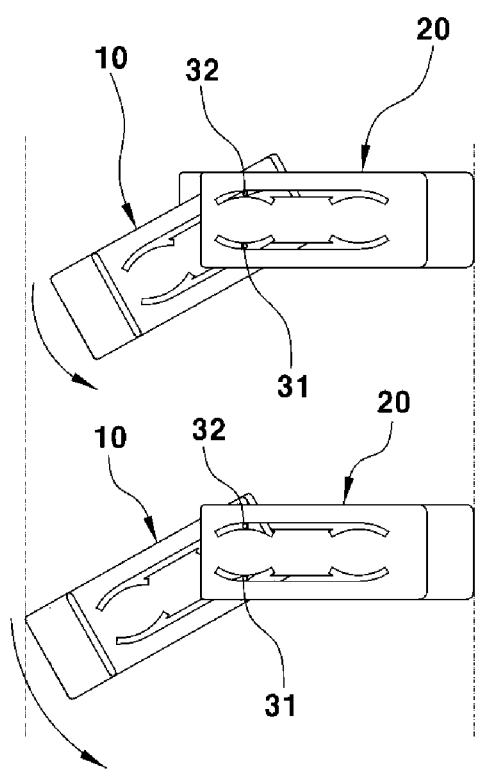

MOVING MULTI CONSOLE FOR VEHICLE

CROSS-REFERENCE TO RELATED APPLICATION

This application claims under 35 U.S.C. § 119(a) the benefit of priority to Korean Patent Application No. 10-2019-0084332 filed on Jul. 12, 2019, the entire contents of which are incorporated herein by reference.

BACKGROUND

(a) Technical Field

The present disclosure relates to a moving multi console for a vehicle. More particularly, it relates to a moving multi console for a vehicle, which is constructed so as to be capable of sliding to spaces in which front and rear seats are located and of being rotated to positions at which the console is to be used, whereby the moving multi console is usable in various applications in the confined interior space in a vehicle.

(b) Background Art

As is well known in the art, a console for a vehicle is fixedly mounted between a driver's seat and a front passenger's seat so as to be used for storing various articles. The console is provided on the upper portion thereof with an armrest, which is openably mounted on the upper portion and on which a driver's arm and a passenger's arm may rest.

However, although the console is a convenient device, which occupies a relatively large space in the interior space of a vehicle, the console is constructed so as to have a simple box shape having a storage space therein, and is fixedly mounted on the floor panel of the vehicle. Hence, there are disadvantages in that the availability of space and the variety of functional uses are deteriorated and in that the console cannot be directly used by a rear passenger.

In an autonomous vehicle, which is to be commercially available in years to come, a flat plate-type panel is used as the interior floor panel owing to exclusion of an engine and a drive shaft. For this reason, a mechanism, which enables a seat, on which a driver and a passenger sits, to be moved forwards and rearwards or swiveled and to be returned to the initial position, is applicable. However, in the case in which the console is fixedly mounted on the floor panel, when a seat is moved forward or rearwards, the console becomes far from the seat, thereby making it difficult for a driver or a passenger to use the console and the armrest.

Furthermore, because the console is positioned within the swivel orbit of the seat fixedly mounted on the floor panel upon swiveling motion of the seat, there is a problem whereby the console interferes with the swiveling motion of the seat.

Accordingly, various attempts to make a console having a structure that allows the console to be moved to positions such that the console is capable of being used by both a front passenger and a rear passenger, a structure that prevents interference with the swiveling motion of a seat and a structure having a function of storing articles therein and various convenience functions, are being researched and developed.

SUMMARY

The present disclosure has been made in an effort to solve the above-described problems associated with the prior art, and it is an object of the present disclosure to provide a moving multi console for a vehicle, which is composed of two pieces, that is, a first console and a second console, which are slidably coupled to and separated from each other and which are capable of sliding to spaces in which front and rear seats are located and of being rotated to positions at which the console is to be used, whereby the moving multi console is usable in various applications in the confined interior space in the vehicle.

In one aspect, the present disclosure provides a moving multi console for a vehicle including a second console slidably and rotatably mounted on a floor panel, a first console slidably and rotatably coupled to the second console, and first and second guide shafts, which are fixed at lower ends thereof to the floor panel and are inserted at upper ends thereof into the second console and the first console so as to guide and support the sliding movement and rotating movement of the second console and the first console.

In one embodiment, the second console may include a rear body having a storage space therein, an upper plate, which extends from an upper portion of the rear body in the longitudinal direction of the rear body, and a lower plate, which extends from the lower portion of the rear body in the longitudinal direction of the rear body and which is slidably and rotatably engaged with the first and second guide shafts.

In another embodiment, a first opening and a second opening, each of which is open at a front face and both lateral side faces thereof, may be respectively defined between the rear body and the upper plate and between the rear body and the lower plate so as to allow the first console to be slidably and rotatably fitted thereinto.

In still another embodiment, the lower plate of the second console may include two or more rows of slide holes, into which the first and second guide shafts are inserted, and rotation guide arcuate holes, which communicate with the slide holes and extend inwards.

In yet another embodiment, the upper plate of the second console may be constituted by a flat plate body so as to be used as a table for a rear seat when the second console is moved rearwards toward the rear seat.

In still yet another embodiment, a caster having a free rotational axis may be mounted on a predetermined point on a lower surface of the lower plate of the second console.

In an embodiment, the first console may include a front body, which extends vertically, an upper body, which extends rearwards from an upper end of the front body and which has a storage space therein, and a lower body, which extends rearwards from a lower end of the front body.

In another embodiment, the upper body and the lower body of the first console may be respectively drawn out of the first opening and the second opening in the second console upon forward movement of the first console, and may be respectively fitted into the first opening and the second opening in the second console upon rearward movement of the first console.

In still another embodiment, the lower body of the first console may include two or more rows of slide grooves, into which the first and second guide shafts are inserted, and rotation guide arcuate grooves, which communicate with the slide grooves and extend inwards.

In yet another embodiment, when the first console is moved forwards, the front body of the first console may be disposed so as to be used as a protector serving as a partition between a driver's seat and a front passenger's seat and to be used as a knee rest on which a driver and a front passenger lean.

In still yet another embodiment, a caster having a free rotational axis may be mounted on a predetermined point on a lower surface of the lower body of the first console.

In a still further embodiment, the first guide shaft and the second guide shaft may be spaced apart from each other in the lateral direction of a vehicle body such that the first console is rotated about the first guide shaft or the second guide shaft or such that the second console is rotated about the first guide shaft or the second guide shaft.

In a yet still further preferred embodiment, a radius of rotation of the first console or the second console when the first console or the second console is rotated about the first guide shaft may be different from a radius of rotation of the first console or the second console when the first console or the second console is rotated about the second guide shaft. The above and other features of the disclosure are discussed infra.

BRIEF DESCRIPTION OF THE DRAWINGS

The above and other features of the present disclosure will now be described in detail with reference to certain exemplary embodiments thereof, illustrated in the accompanying drawings which are given hereinbelow by way of illustration only, and thus are not limitative of the present disclosure, and wherein:

FIGS. 14A and 14B are bottom views illustrating the difference in a radius of rotation of a first console of the moving multi console for a vehicle according to the present disclosure when the first console is rotated.

Figure 1:
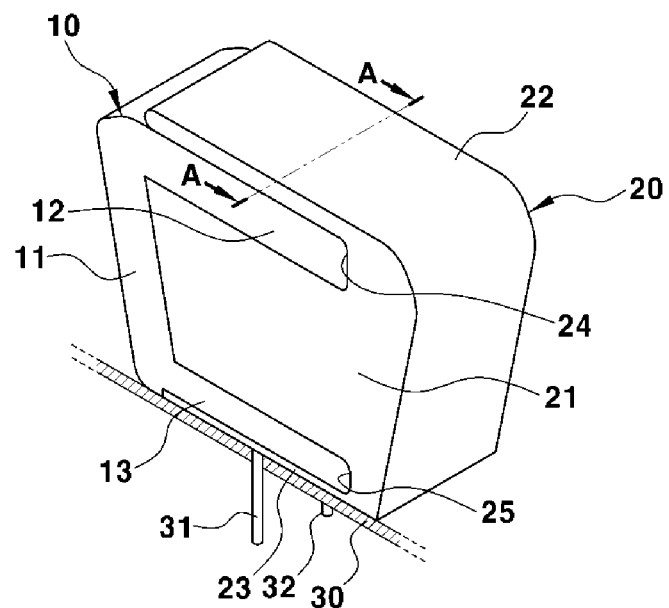
FIG. 1 is a perspective view illustrating a moving multi console for a vehicle according to the present disclosure, which is mounted on a floor panel.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, a preferred embodiment of the present disclosure will be described in detail with reference to the accompanying drawings.

FIGS. 1 to 7 of the accompanying drawings illustrate a moving multi console for a vehicle according to the present disclosure. In the drawings, reference numeral "10" denotes a first console, and reference numeral "20" denotes a second console.

The moving multi console according to the present disclosure is composed of two pieces, that is, the first console 10 and the second console 20, which are slidably coupled to each other and are separated from each other.

The second console 20 is slidably and rotatably mounted on the floor panel in the interior of a vehicle, and the first console 10 is slidably and rotatably coupled to the second console 20.

First and second guide shafts 31 and 32, which serve as shafts for sliding movement and rotating movement of the first console 10 and the second console 20, are disposed between the floor panel 30 and consoles 10 and 20 and are connected thereto.

More specifically, the first and second guide shafts 31 and 32 are fixed at the lower ends thereof to the floor panel 30 and are inserted at the upper ends thereof into the first console 10 and the second console 20 so as to serve as shafts, guides and supports for sliding movement and rotating movement of the first console 10 and the second console 20.

The second console 20 includes a rear body 21 having therein a storage space 21-1, an upper plate 22, which extends forwards from the rear end of the top surface of the rear body 21, and a lower plate 23, which extends forwards from the rear end of the bottom surface of the rear body 21 and which is slidably and rotatably engaged with the first and second guide shafts 31 and 32.

Figure 2:
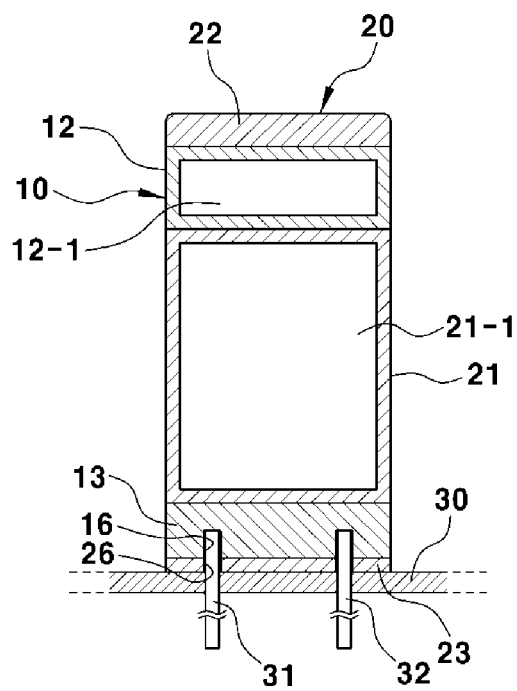
FIG. 2 is a cross-sectional view taken along line A-A of FIG. 1, which illustrates the moving multi console for a vehicle according to the present disclosure, which is mounted on the floor panel.
Figure 3:
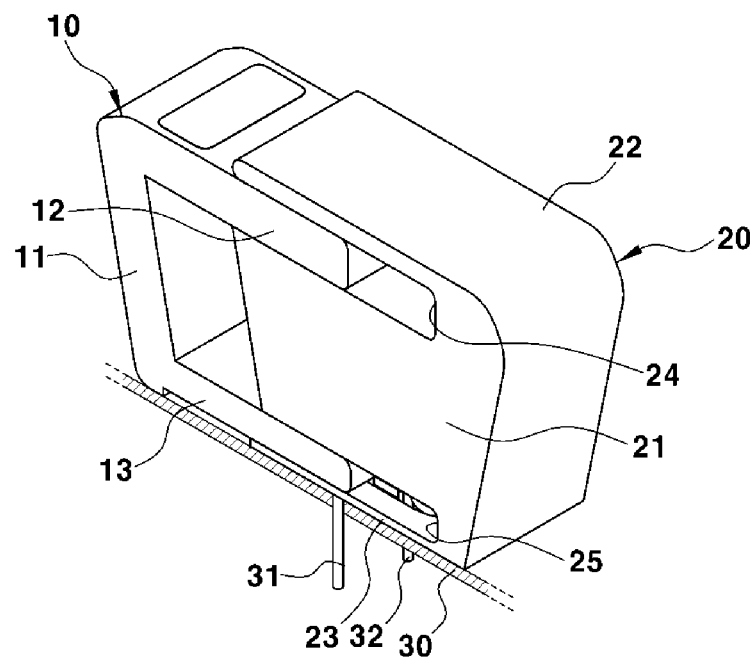
FIGS. 3 and 4 are perspective views illustrating the moving multi console for a vehicle according to the present disclosure, which is in the separated state due to sliding movement.

More specifically, as illustrated in FIG. 2, the rear body 21 is constructed so as to define therein the storage space 21-1 for storing articles therein, and the lower plate 23 is constituted by a flat plate, which is parallel to the floor panel 30. As described later, the upper plate 22 is constituted by a flat plate body so as to serve as a table for a rear seat when the second console 20 is moved toward the rear seat.

Particularly, a first opening 24, which is open at the front face and both lateral side faces thereof, is defined between the upper surface of the rear body 21 and the lower surface of the upper plate 22, and a second opening 25, which is open at the front face and both lateral faces thereof, is defined between the lower surface of the rear body 21 and the upper surface of the lower plate 23.

As described later, the first opening 24 and the second opening 25 are spaces into which an upper body 12 and a lower body 13 of the first console 10 are slidably and rotatably fitted.

Furthermore, for sliding movement and rotating movement of the second console 20, two rows of slide holes 26 and a pair of rotation guide arcuate holes 27 (shown in FIG. 4) are vertically formed through the lower plate 23 so as to allow the guide shafts 31 and 32 to be inserted thereinto.

Figure 4:
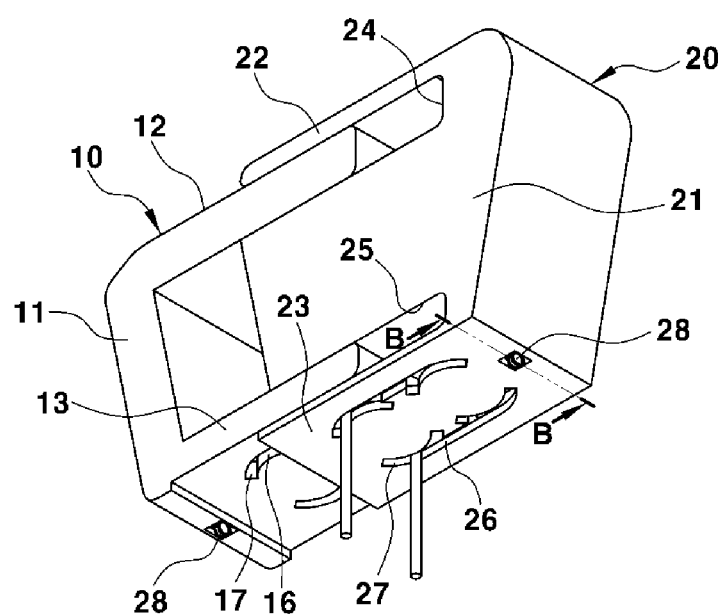
Figure 5:
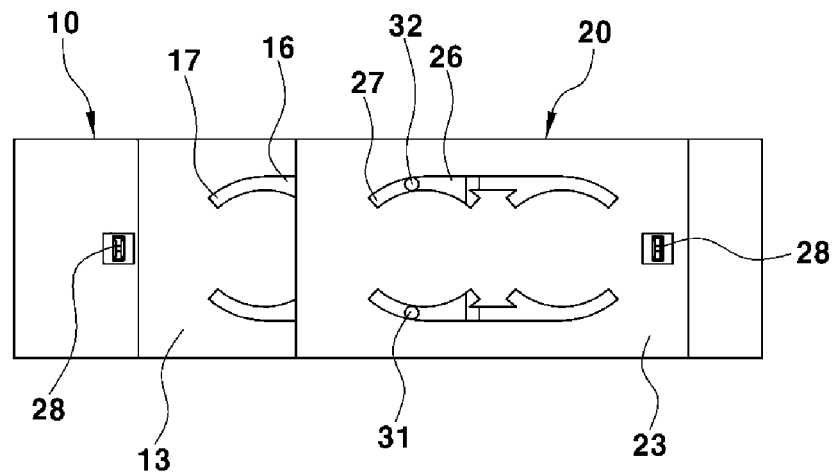
FIG. 5 is a bottom view illustrating the moving multi console for a vehicle according to the present disclosure, which is in the separated state due to sliding movement.

As illustrated in FIGS. 4 and 5, more specifically, the two rows of slide holes 26 are formed in the lower plate 23 so as to extend anteroposteriorly, and the rotation guide arcuate holes 27 extend inwards from front and rear portions of the slide holes 26 and communicate with the slide holes 26.

In order to ensure more free sliding and rotating movement of the second console 20, a caster 28 having a free rotational axis is mounted at a predetermined point on the lower surface of the lower plate 23.

Accordingly, since the caster 28 rolls on the surface of the floor panel 30 when the second console 20 slides or is rotated, the second console 20 may more smoothly slide or be rotated.

The first console 10 includes a front body 11, which extends vertically, an upper body 12, which horizontally extends rearwards from the upper end of the front body 11 and defines therein a storage space 12-1, and a lower body 13, which horizontally extends rearwards from the lower end of the front body 11, the three components being integrally formed with one another.

The upper body 12 and the lower body 13 of the first console 10 are slidably and rotatably fitted into the first opening 24 and the second opening 25 in the second console 20, respectively. Accordingly, when the first console 10 is moved forward, the upper body 12 and the lower body 13 are respectively drawn out of the first opening 24 and the second opening 25 in the second console 20. Meanwhile, when the first console 10 is moved rearward, the upper body 12 and the lower body 13 are respectively fitted into the first opening 24 and the second opening 25 in the second console 20.

For sliding and rotating movement of the first console 10, two rows of slide grooves 16 and a pair of rotation guide arcuate grooves 17 are formed in the lower surface of the lower body 13 so as to allow the first and second guide shafts 31 and 32 to be inserted thereinto.

As illustrated in FIGS. 4 and 5, more specifically, the two rows of slide grooves 16 are formed in the lower surface of the lower body 13 so as to extend anteroposteriorly, and the rotation guide arcuate grooves 17 extend inwards from front and rear portions of the slide grooves 16 and communicate with the slide grooves 16.

When the first console 10 and the second console 20 are coupled to each other, that is, when the upper body 12 and the lower body 13 of the first console 10 are respectively fitted into the first opening 24 and the second opening 25 in the second console 20, the slide grooves 16 and the rotation guide arcuate grooves 17 formed in the lower body 13 coincide with the slide holes 26 and the rotation guide arcuate holes 27 formed in the lower plate 23 in a vertical direction.

Meanwhile, when the first console 10 and the second console 20 are separated from each other, that is, when the upper body 12 and the lower body 13 of the first console 10 are respectively drawn out of the first opening 24 and the second opening 25 in the second console 20, the slide grooves 16 formed in the lower body 13 coincide with the slide hole 26 formed in the lower plate 23 only in a partial zone in a vertical direction, as illustrated in FIGS. 4 and 5.

In order to ensure more smooth sliding and rotating movement of the first console 10, the caster 28 having a free rotational axis is mounted at a predetermined point on the lower surface of the lower body 13.

Since the first and second guide shafts 31 and 32 are disposed in the slide grooves 16 in the lower body 13 through the slide holes 26 in the lower plate 23 upon sliding movement of the first console 10 and the second console 20, the first console 10 and the second console 20 stably perform the sliding movement by virtue of guidance and support of the first and second guide shafts 31 and 32.

Since the first and second guide shafts 31 and 32 are moved into the rotation guide arcuate holes 27 in the lower plate 23 and the rotation guide arcuate grooves 17 in the lower body 13 upon rotating movement of the first console 10 and the second console 20, the first console 10 and the second console 20 stably perform rotating movement by virtue of guidance and support of the first and second guide shafts 31 and 32.

Furthermore, since the casters 28, which are mounted on the lower surfaces of the lower body 13 and the lower plate 23, roll on the surface of the floor panel 30 upon sliding and rotating movement of the first console 10 and the second console 20, the first console 10 and the second console 20 more smoothly perform sliding and rotating movement of the first console 10 and the second console 20.

As illustrated in FIG. 2, the storage space 12-1 is defined in the upper body 12, and the storage space 21-1 is defined in the rear body 21. An openable door (not shown) may be mounted at a predetermined location on the upper body 12 in order to utilize the storage space 12-1, and an openable door (not shown) may be mounted at a predetermined location on the rear body 21 in order to utilize the storage space 21-1.

Figure 6:
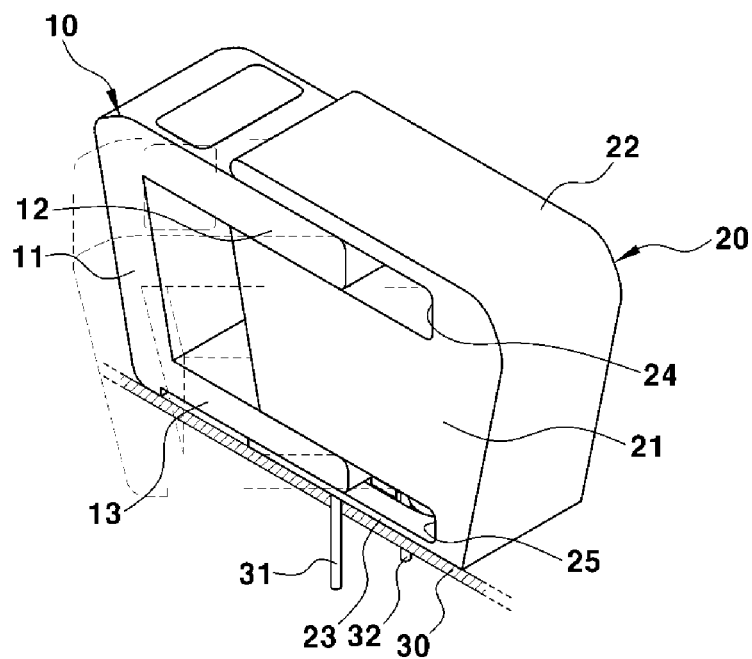
FIGS. 6 and 7 are perspective views of rotating motion of the moving multi console for a vehicle according to the present disclosure.
Figure 7:
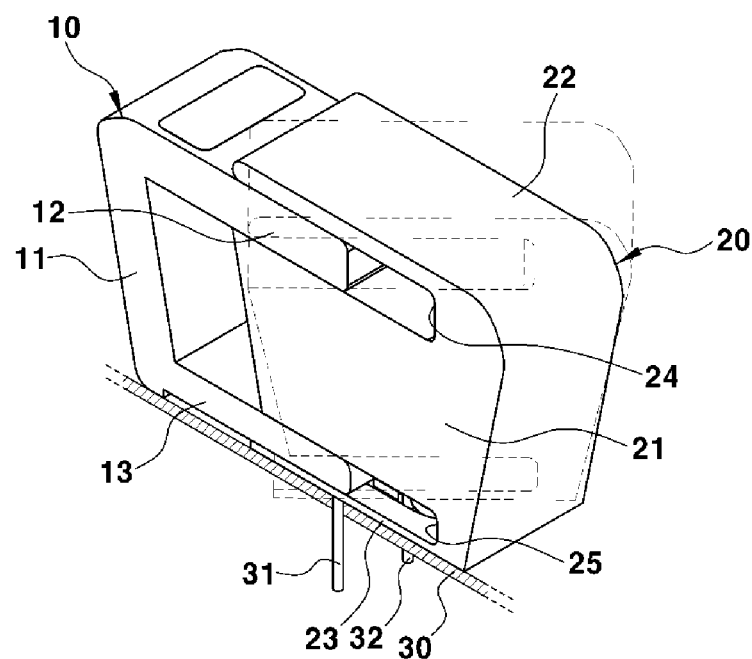
Figure 8:
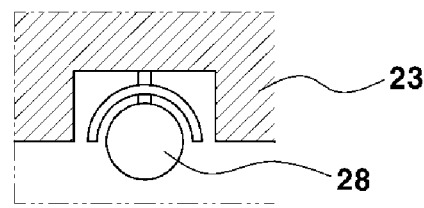
FIG. 8 is a cross-sectional view taken along line B-B of FIG. 4.

Since the first guide shaft 31 and the second guide shaft 32 are spaced apart from each other in a lateral direction of a vehicle body, the first console 10 may be rotated laterally about the first guide shaft 31 or the second guide shaft 32, as illustrated in FIG. 6, and the second console 20 may be rotated laterally about the first guide shaft 31 or the second guide shaft 32, as illustrated in FIG. 7.

The radius of rotation of the first console 10 or the second console 20 when the first console 10 or the second console 20 is rotated about the first guide shaft 31 is different from the radius of rotation of the first console 10 or the second console 20 when the first console 10 or the second console 20 is rotated about the second guide shaft 32 in the same direction.

Figure 13A:
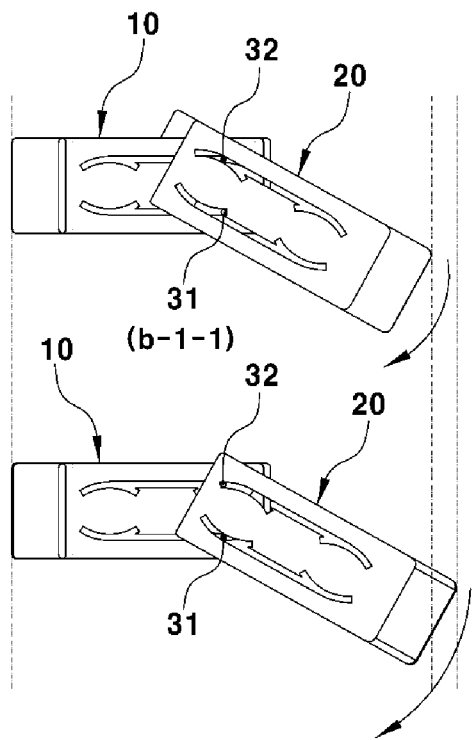
FIGS. 13A and 13B are bottom views illustrating the difference in a radius of rotation of a second console of the moving multi console for a vehicle according to the present disclosure when the second console is rotated.

More specifically, the radius of rotation of the second console 20 when the second console 20 is rotated about the second guide shaft 32 in one direction, as illustrated in the upper side of FIG. 13A, is smaller than the radius of rotation of the second console 20 when the second console 20 is rotated about the first guide shaft 31 in one direction, as illustrated in the lower side of FIG. 13A.

Figure 13B:
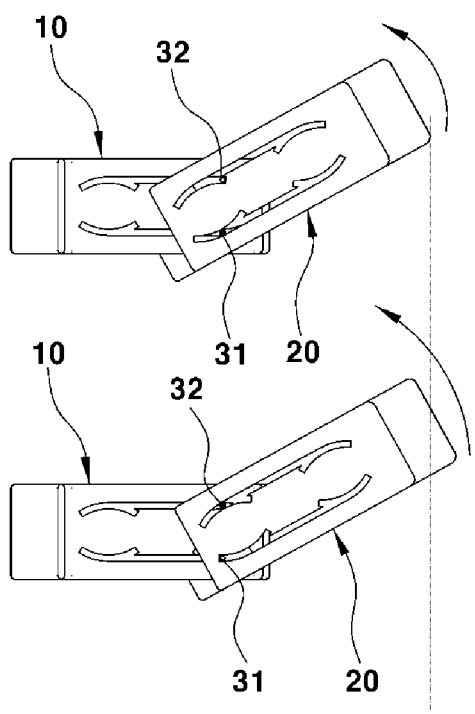

Furthermore, the radius of rotation of the second console 20 when the second console 20 is rotated about the first guide shaft 31 in the other direction, as illustrated in the upper side of FIG. 13B, is smaller than the radius of rotation of the second console 20 when the second console 20 is rotated about the second guide shaft 32 in the other direction, as illustrated in the lower side of FIG. 13B.

Accordingly, it is possible to easily rotate the second console 20 while adjusting the radius of rotation of the second console 20 according to the size of the interior space to which the second console 20 is intended to be rotated.

Meanwhile, the radius of rotation of the first console 10 when the first console 10 is rotated about the second guide shaft 32 in one direction, as illustrated in the upper side of FIG. 14A, is smaller than the radius of rotation of the first console 10 when the first console 10 is rotated about the first guide shaft 31 in one direction, as illustrated in the lower side of FIG. 14A.

Figure 14B:
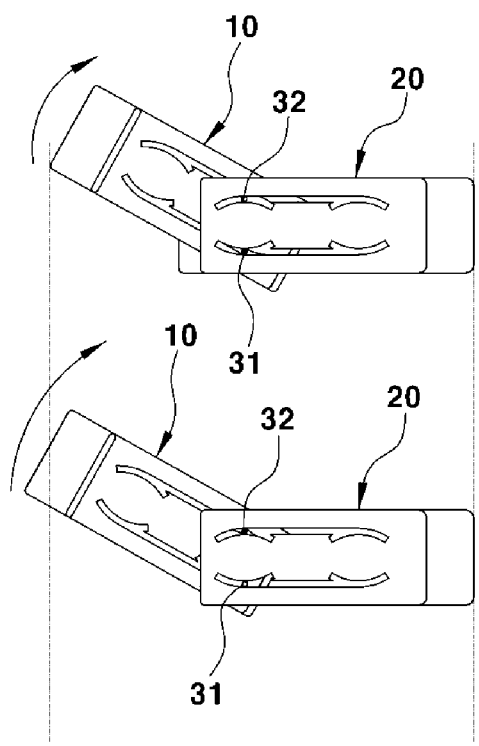

Furthermore, the radius of rotation of the first console 10 when the first console 10 is rotated about the first guide shaft 31 in the other direction, as illustrated in the upper side of FIG. 14B, is smaller than the radius of rotation of the first console 10 when the first console 10 is rotated about the second guide shaft 32 in the other direction, as illustrated in the lower side of FIG. 14B.

Accordingly, it is possible to easily rotate the first console 10 while adjusting the radius of rotation of the first console 10 according to the size of the interior space to which the first console 10 is intended to be rotated.

The operating state and use state of the moving multi console for a vehicle according to the present disclosure will now be described.

Walk-Through Mode of the Moving Multi Console

Figure 9A:
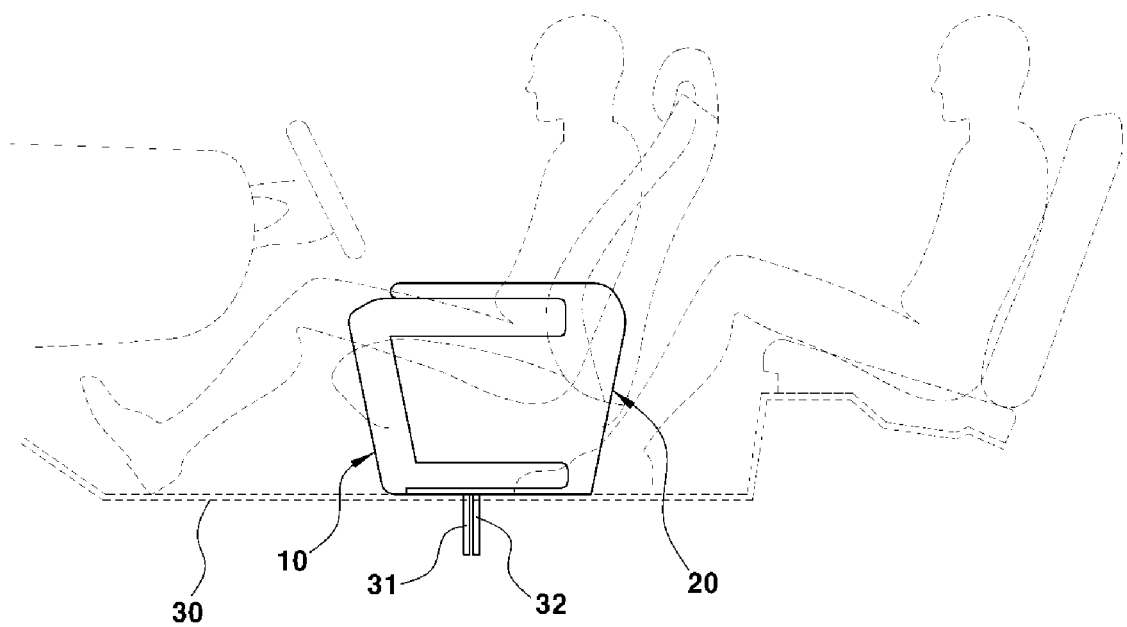
FIGS. 9A and 9B are views illustrating the moving multi console for a vehicle according to the present disclosure, which is adjusted for a walk-through mode.
Figure 9B:
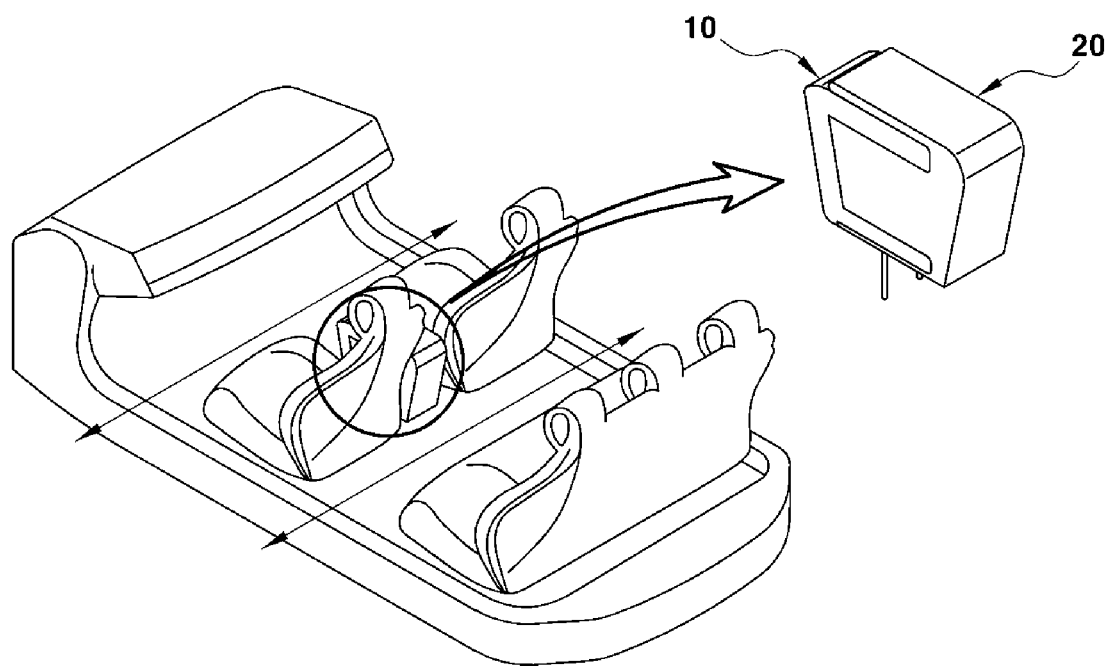

FIGS. 9A and 9B illustrate the moving multi console for a vehicle according to the present disclosure, which is adjusted for a walk-through mode.

The walk-through mode refers to a mode in which the space through which a passenger sits in the front seat or the rear seat of a vehicle and gets out of the vehicle is maximized.

To this end, the first console 10 and the second console 20 are fitted into each other so as to minimize the overall volume of the moving multi console and the first console 10 and the second console 20 are disposed between the driver's seat and the front passenger's seat, as illustrated in FIGS. 9A and 9B.

More specifically, after the upper body 12 and the lower body 13 of the first console 10 are respectively fitted into the first opening 24 and the second opening 25 in the second console 20, the first and second guide shafts 31 and 32 are positioned at the center points of the slide grooves 16 in the lower body 13 and the slide holes 26 in the lower plate 23, which coincide with each other in a vertical direction, whereby the first console 10 and the second console 20, which are engaged with into each other, are disposed between the driver's seat and the front passenger's seat.

Consequently, when a passenger sits in the front seat or the rear seat or gets out of the front seat or the rear seat, it is possible to easily get into and get out of a vehicle without interference with the first console 10 and the second console 20, thereby allowing the passenger to freely move in the interior of the vehicle.

Rear Seat Convenience Mode

Figure 10A:
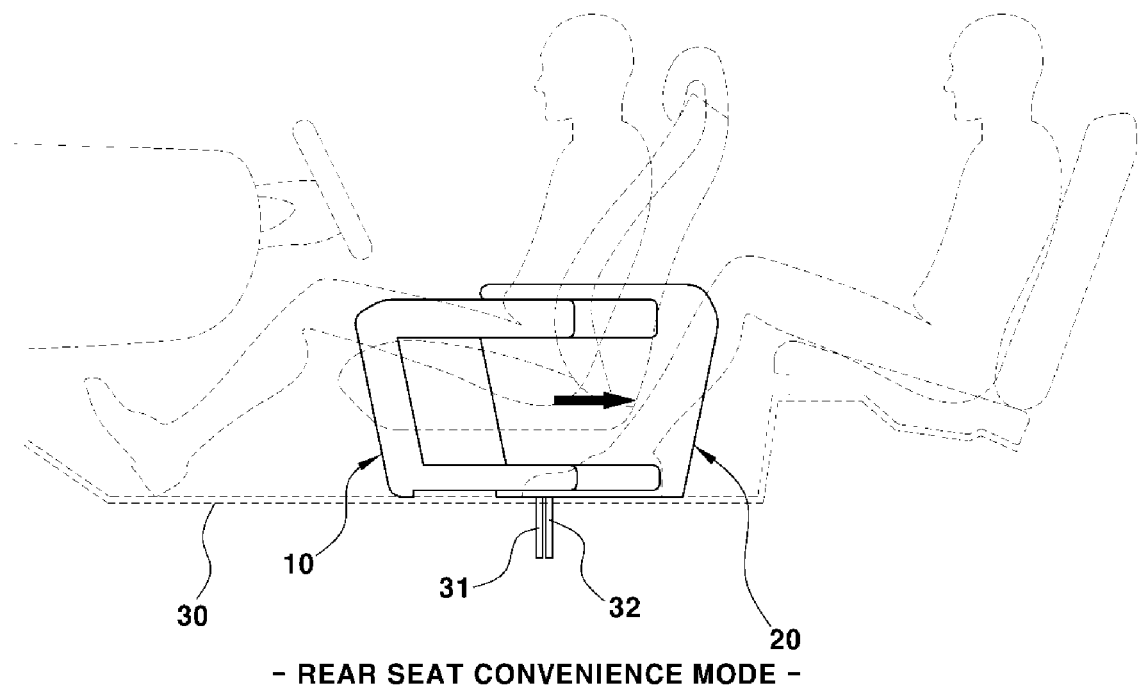
FIGS. 10A and 10B are views illustrating the moving multi console for a vehicle according to the present disclosure, which is adjusted for a rear seat convenience mode.
Figure 10B:
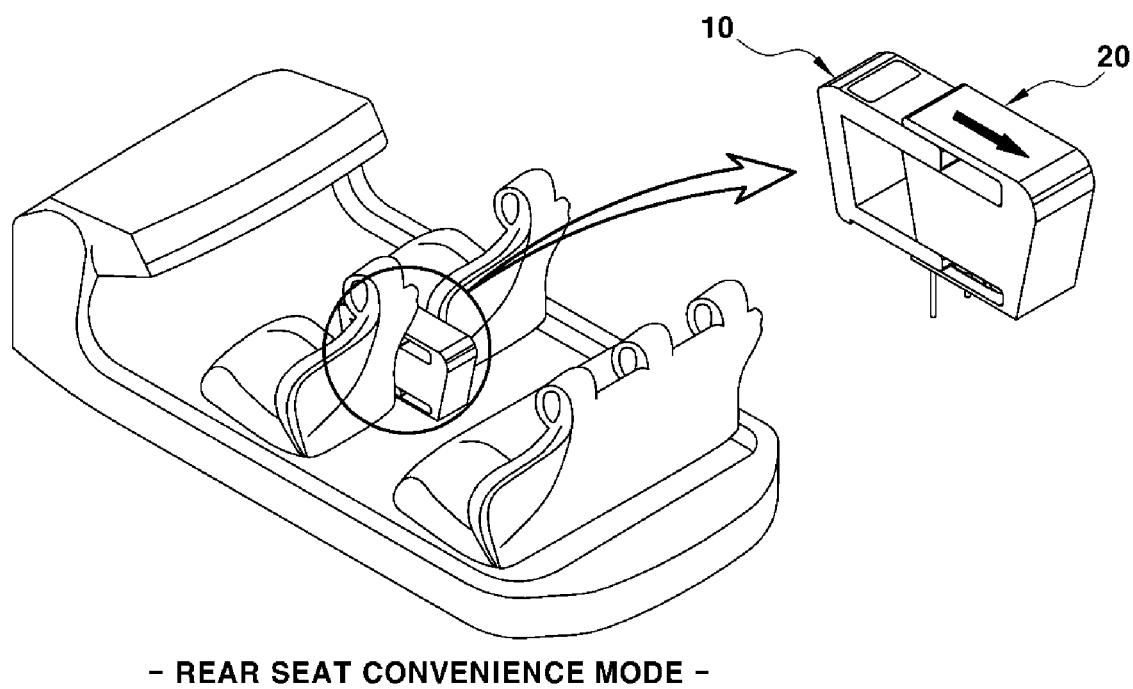

FIGS. 10A and 10B illustrate the moving multi console for a vehicle according to the present disclosure, which is adjusted for the rear seat convenience mode.

The rear seat convenience mode refers to a mode in which the second console 20 is moved rearward for a rear passenger's convenience.

To this end, the second console 20 is separated from the first console 10 and is slid rearwards to a position at which the second console 20 can be used for a rear passenger, as illustrated in FIGS. 10A and 10B.

More specifically, when only the second console 20 is pulled and moved rearwards in the state in which the upper body 12 and the lower body 13 of the first console 10 are stationary, the lower plate 23 of the second console 20 is moved rearwards, and the first and second guide shafts 31 and 32 are positioned at the front portions of the slide holes 26 in the lower plate 23, whereby the upper plate 22 of the second console 20 is moved to a position at which the upper plate 22 can be conveniently used for a rear passenger.

Here, since the upper plate 22 is constituted by a flat plate body, the upper plate 22 may be used as a table for a rear seat, on which a cup or beverage is placed by a rear passenger.

Since the rear body 21 is also moved rearwards when the second console 20 is moved rearwards, the storage space 21-1 in the rear body 21 may be conveniently used by a rear passenger.

Front Seat Convenience Mode

Figure 11A:
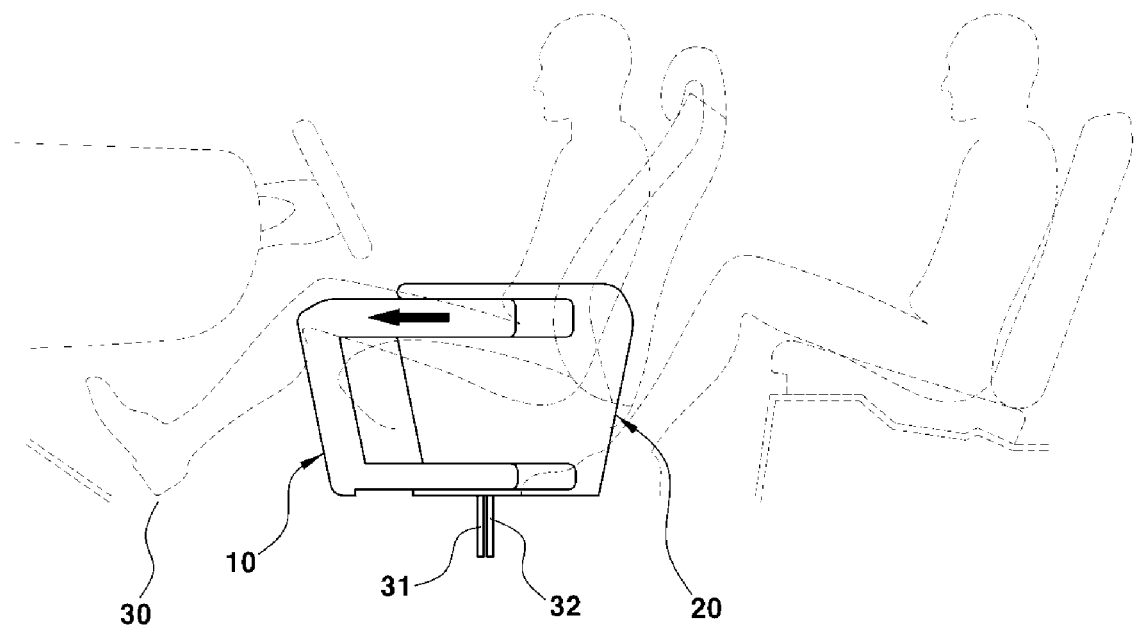
FIGS. 11A, 11B, 11C, and 11D are views illustrating the moving multi console for a vehicle according to the present disclosure, which is adjusted for a front seat convenience mode.
Figure 11B:
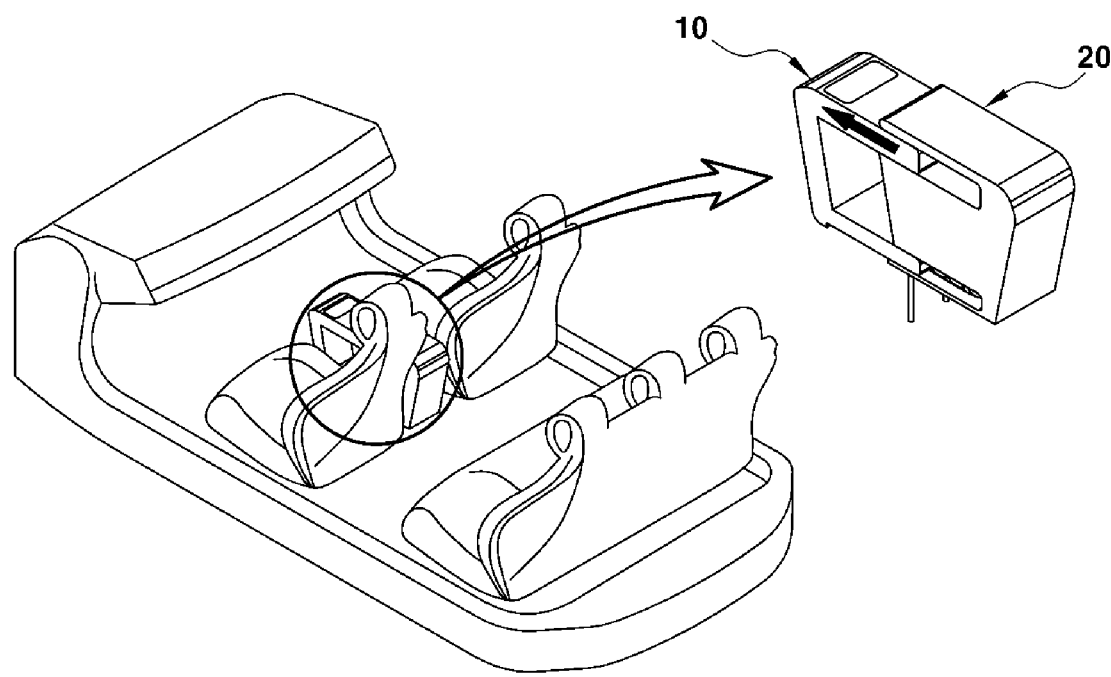

FIGS. 11A and 11B illustrate the moving multi console for a vehicle according to the present disclosure, which is adjusted for the front seat convenience mode.

The front seat convenience mode refers to a mode in which the first console 10 is moved forwards for the convenience of the driver and the front passenger.

To this end, the first console 10 is separated from the second console 20 and is slid forwards to a position at which the first console 10 can be used by a driver and a front passenger, as illustrated in FIGS. 11A and 11B.

More specifically, when only the first console 10 is pulled and moved forwards in the state in which the second console 20 is stationary, the upper body 12 and the lower body 13 of the first console 10 are respectively drawn out of the first opening 24 and the second opening 25 in the second console 20 and are moved forwards, and the first and second guide shafts 31 and 32 are positioned at the rear portions of the slide grooves 16, whereby the first console 10 is moved to a position at which the first console 10 can be conveniently used for a driver and a front passenger.

Figure 11C:
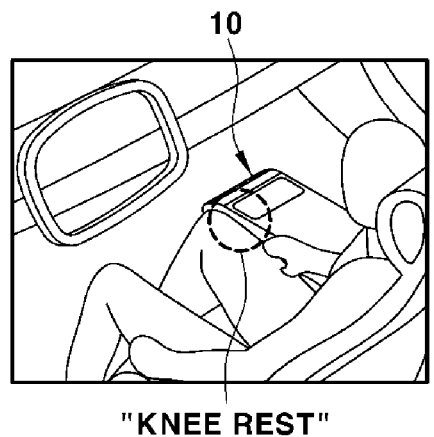
Figure 11D:
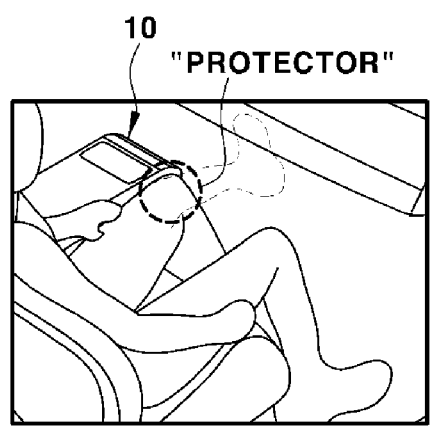

At this time, the front body 11 of the first console 10 is disposed so as to be used as a protector serving as a partition between a driver's seat and a front passenger's seat and to be used as a knee rest on which a driver's knees and a front passenger's knees lean, as shown in FIGS. 11C and 11D.

Accordingly, since it is possible for driver's knees and a front passenger's knees to lean on the lateral side portions of the front body 110 of the first console 10 and the like, it is possible for them to take comfortable positions. Furthermore, since the front body 11 of the first console 10 serves as a protector for preventing a front passenger from accessing the accelerator pedal or the brake pedal and from performing erroneous operation, it is possible to ensure safe driving.

Other Operation Modes

FIGS. 12A to 12E illustrate the moving multi console for a vehicle according to the present disclosure, which is adjusted so as to take various positions.

The other operation modes refer to modes in which the moving multi console is freely moved to a specific passenger (a passenger who wants to use the console), and particularly the moving multi console is moved to a usable position when a seat of an autonomous vehicle is moved forwards or rearwards, swiveled or partially swiveled.

Figure 12A:
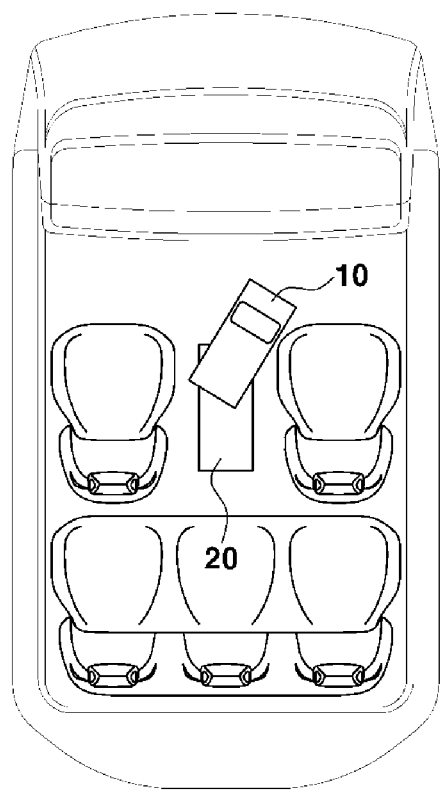
FIGS. 12A, 12B, 12C, 12D, and 12E are views illustrating the moving multi console for a vehicle according to the present disclosure, which is adjusted to various positions.

For example, as illustrated in FIG. 12A, it is possible for the passenger sitting in the front passenger's seat to conveniently use the first console 10 by rotating the first console 10 toward the front passenger's seat.

Figure 12B:
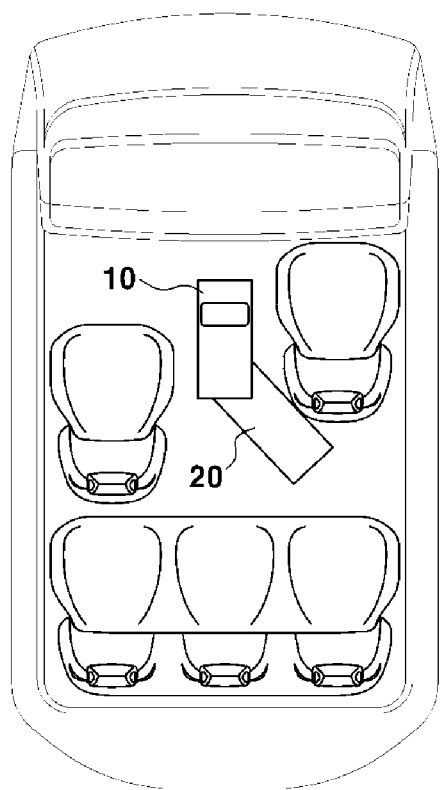

When the front passenger's seat is moved forwards, as illustrated in FIG. 12B, it is possible for the passenger sitting in the rear seat to use the second console 20 as a footrest or the like by rotating the second console 20 toward the space in which the front passenger's seat was positioned before the forward movement.

Figure 12C:
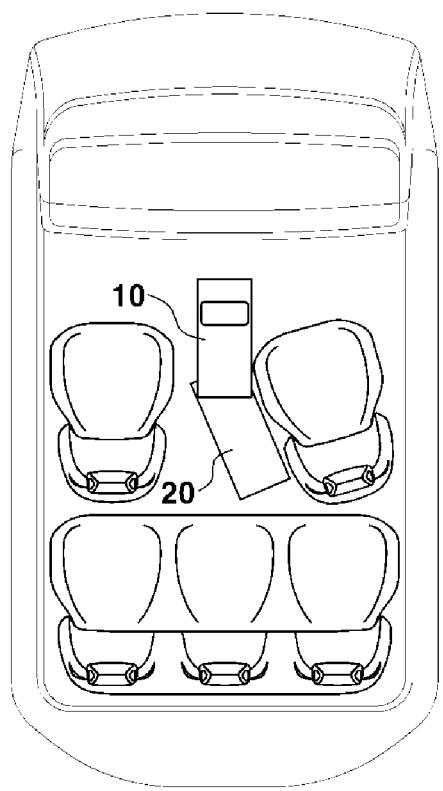

When the front passenger's seat is partially swiveled, as illustrated in FIG. 12C, it is possible for the front passenger to conveniently use the second console 20 by rotating the second console 20 toward the front passenger's seat, which has been partially swiveled, so as to be close to the front passenger's seat.

Figure 12D:
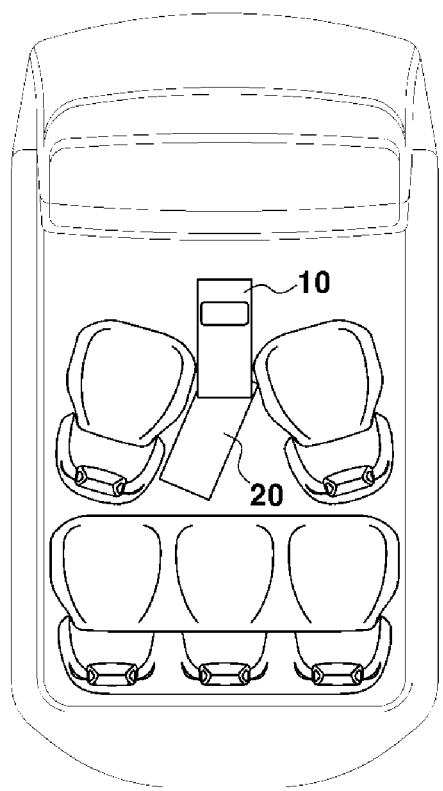

When the driver's seat is partially swiveled, as illustrated in FIG. 12D, it is possible for the driver to conveniently use the second console 20 by rotating the second console 20 toward the driver's seat, which has been partially swiveled, so as to be close to the driver's seat.

Figure 12E:
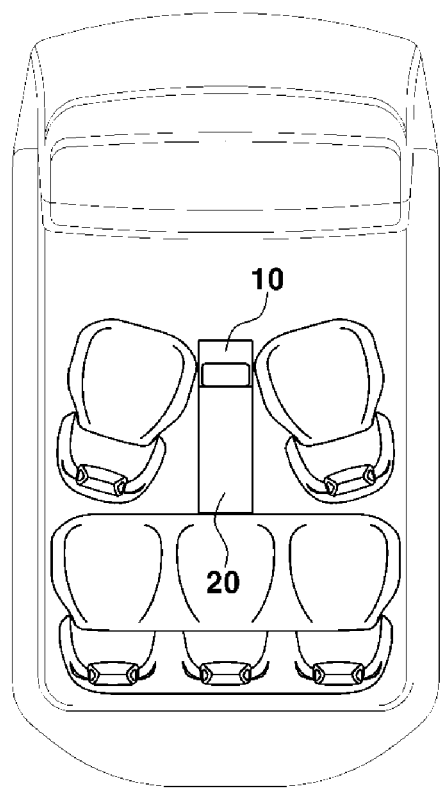

When both the driver's seat and the front passenger's seat are partially swiveled inwards, as illustrated in FIG. 12E, it is possible for the driver, the front passenger and the rear passenger to share the first console 10 and the second console 20 with one another by moving both the first console 10 and the second console 20 rearwards.

In these ways, since the moving multi console according to the present disclosure is capable of being moved to various positions, at which the moving multi console is used by the driver or the passenger, by virtue of forward and rearward movement and rotating movement, it is possible to improve the convenience in use of the moving multi console.

By virtue of the above-described construction, the present disclosure offers the following effects.

First, since the moving multi console is composed of two pieces, that is, the first console and the second console, which are capable of being coupled to and separated from each other and which are slidably and rotatably mounted on the floor panel, it is possible to use the moving multi console in various applications in the confined interior space of a vehicle.

Second, when the second console is separated from the first console and is slid rearwards, it is possible for a rear passenger to use the upper surface of the second console as a table or the like.

Third, when the first console is separated from the second console and is slid forwards, it is possible to use the first console as a knee rest for a driver and a front passenger and as a protector serving as a partition between a driver's seat and a front passenger's seat.

Fourth, when a seat, which is applied to an autonomous vehicle or the like, is swiveled, it is possible to move or rotate the console beyond the orbit along which the seat is swiveled, and it is possible to easily swivel the seat without interference with the console.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents

The invention claimed is:

1. A moving multi console for a vehicle comprising:
  a second console slidably and rotatably mounted on a floor panel;
  a first console slidably and rotatably coupled to the second console; and
  first and second guide shafts, which are fixed at lower ends thereof to the floor panel and are inserted at upper ends thereof into the second console and the first console so as to guide and support sliding movement and rotating movement of the second console and the first console.

2. The moving multi console of claim 1, wherein the second console includes:
  a rear body having a storage space therein;
  an upper plate, which extends from an upper portion of the rear body in a longitudinal direction of the rear body; and
  a lower plate, which extends from a lower portion of the rear body in the longitudinal direction of the rear body and which is slidably and rotatably engaged with the first and second guide shafts.

3. The moving multi console of claim 2, wherein a first opening and a second opening, each of which is open at a front face and both lateral side faces thereof, are respectively defined between the rear body and the upper plate and between the rear body and the lower plate so as to allow the first console to be slidably and rotatably fitted thereinto.

4. The moving multi console of claim 2, wherein the lower plate of the second console includes two or more rows of slide holes, into which the first and second guide shafts are inserted, and rotation guide arcuate holes, which communicate with the slide holes and extend inwards.

5. The moving multi console of claim 2, wherein the upper plate of the second console is constituted by a flat plate body so as to be used as a table for a rear seat when the second console is moved rearwards toward the rear seat.

6. The moving multi console of claim 2, wherein a caster having a free rotational axis is mounted on a predetermined point on a lower surface of the lower plate of the second console.

7. The moving multi console of claim 1, wherein the first console includes:
  a front body, which extends vertically;
  an upper body, which extends rearwards from an upper end of the front body and which has a storage space therein; and
  a lower body, which extends rearwards from a lower end of the front body.

8. The moving multi console of claim 7, wherein the upper body and the lower body of the first console are respectively drawn out of the first opening and the second opening in the second console upon forward movement of the first console, and are respectively fitted into the first opening and the second opening in the second console upon rearward movement of the first console.

9. The moving multi console of claim 7, wherein the lower body of the first console includes two or more rows of slide grooves, into which the first and second guide shafts are inserted, and rotation guide arcuate grooves, which communicate with the slide grooves and extend inwards.

10. The moving multi console of claim 7, wherein, when the first console is moved forwards, the front body of the first console is disposed so as to be used as a protector serving as a partition between a driver's seat and a front passenger's seat and to be used as a knee rest on which a driver and a front passenger lean.

11. The moving multi console of claim 7, wherein a caster having a free rotational axis is mounted on a predetermined point on a lower surface of the lower body of the first console.

12. The moving multi console of claim 1, wherein the first guide shaft and the second guide shaft are spaced apart from each other in a lateral direction of a vehicle body such that the first console is rotated about the first guide shaft or the second guide shaft or such that the second console is rotated about the first guide shaft or the second guide shaft.

13. The moving multi console of claim 12, wherein a radius of rotation of the first console or the second console when the first console or the second console is rotated about the first guide shaft is different from a radius of rotation of the first console or the second console when the first console or the second console is rotated about the second guide shaft.

* * * * *